(12) United States Patent
Bangalore Ananthakumar et al.

(10) Patent No.: US 10,776,346 B2
(45) Date of Patent: Sep. 15, 2020

(54) SYSTEMS AND METHODS FOR PROVIDING FLEXIBLE DATA ACCESS

(71) Applicant: PAYPAL, INC., San Jose, CA (US)

(72) Inventors: Swathi Bangalore Ananthakumar, San Jose, CA (US); Venkata Ramana Varma Nadimpalli, Fremont, CA (US); Alexander Yuryevich Shvid, San Jose, CA (US); Karl Anton Hennig, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 167 days.

(21) Appl. No.: 16/016,498

(22) Filed: Jun. 22, 2018

(65) Prior Publication Data
US 2019/0392065 A1 Dec. 26, 2019

(51) Int. Cl.
*G06F 7/00* (2006.01)
*G06F 16/23* (2019.01)
*G06F 16/22* (2019.01)
*G06Q 20/10* (2012.01)

(52) U.S. Cl.
CPC ...... *G06F 16/2379* (2019.01); *G06F 16/2228* (2019.01); *G06F 16/2282* (2019.01); *G06Q 20/10* (2013.01)

(58) Field of Classification Search
CPC ............. H06F 16/2379; G06F 16/2282; G06F 16/278; G06F 16/2379; G06F 16/2228; G06Q 20/10

USPC .................................................. 707/600–899
See application file for complete search history.

(56) References Cited

U.S. PATENT DOCUMENTS

2019/0179951 A1* 6/2019 Brunet .................. H04L 9/0819

OTHER PUBLICATIONS

"MessagePack: It's like JSON. but fast and small.", 3 pages [online], [retrieved on Jun. 17, 2018]. Retrieved from the Internet: <URL:http://msgpack.org/index.html>.
Lua, "Programming in Lua : 2.5", 3 pages [online], [retrieved on Jun. 17, 2018]. Retrieved from the Internet: <URL: https://www.lua.org/pil/2.5.html>.

* cited by examiner

*Primary Examiner* — Isaac M Woo
(74) *Attorney, Agent, or Firm* — Haynes and Boone, LLP

(57) ABSTRACT

Methods and systems are presented for accessing various data values in a record stored in a data store independently from other data values in the record and without taking computationally expensive or storage-intensive procedures such as de-serializing a record based on a primary key. A data service module is provided to access each record in a data store, and generate for the records a table including a map of key-value pairs representing the data values in the records. When the data service module receives a request from an application for accessing a first data value in a first record, the data service module may retrieve a first key-value pair corresponding to the first data value in the first record without de-serializing the record. The data service module then provides a first value of the first key-value pair to the application.

20 Claims, 7 Drawing Sheets

| | | | | |
|---|---|---|---|---|
| 602 — First Name | John | | 618 — Total Transactions | 2 |
| 604 — Last Name | Doe | | 620 — Total Amount | $1,327 |
| 606 — Gender | M | | 622 — Trans 1 Date | 2018/1/30 |
| 608 — Age | 35 | | 624 — Trans 1 Payee | Jane |
| 610 — Overall Risk Level | 1 | | 626 — Trans 1 Amount | $627 |
| 612 — ATO Score | 260 | | 628 — Trans 2 Date | 2018/4/7 |
| 614 — Login Attempts | 8 | | 630 — Trans 2 Payee | Michael |
| 616 — Login Failed | 1 | | 632 — Trans 2 Amount | $700 |

Table 600

SYSTEMS AND METHODS FOR PROVIDING FLEXIBLE DATA ACCESS

BACKGROUND

The present specification generally relates to data access systems, and more specifically, to providing a data access layer on top of a data store to enhance the speed and flexibility of retrieving and updating data from the data store according to various embodiments of the disclosure.

RELATED ART

Today, an entity that provides online services to users may receive millions of online transaction requests each day. For example, a server (e.g., a web server) may enable a user to make a login request for logging in to a user account, a payment transaction request for performing an electronic payment transaction, an onboarding request for adding a new user account, or any other types of online transaction requests. Before processing each of these online transaction requests, the server may access information about the user and/or a user account stored in a data store to determine whether the request is a legitimate request or a fraudulent request. The server may then act accordingly (e.g., to grant or deny the request).

The information about the user and/or the user account may be stored as a record in the data store according to a particular data structure. The record of a user account may contain a large volume of data associated with the user account, including historic transaction information, demographic information, risk information, and other types of information related to the user account. When a request is made by the server to access the record (even though the server may only request to access a portion of the record), the data store may be required to first retrieve the entire record in a serialized format based on a primary key of the record. The data store may then be required to de-serialize the entire record before providing the portion of the record to the server.

Retrieving and de-serializing the entire record every time an online transaction request is received is costly with respect to time and processing power, especially when millions of online transaction requests may be received every day, as discussed above. Thus, there is a need for providing an improved data access framework to increase the performance of processing such online transaction requests.

BRIEF DESCRIPTION OF THE FIGURES

FIG. 6 illustrates an exemplary table of key-value pairs according to an embodiment of the present disclosure;

FIG. 6 illustrates another exemplary node structure according to an embodiment of the present disclosure.

Figure 1:
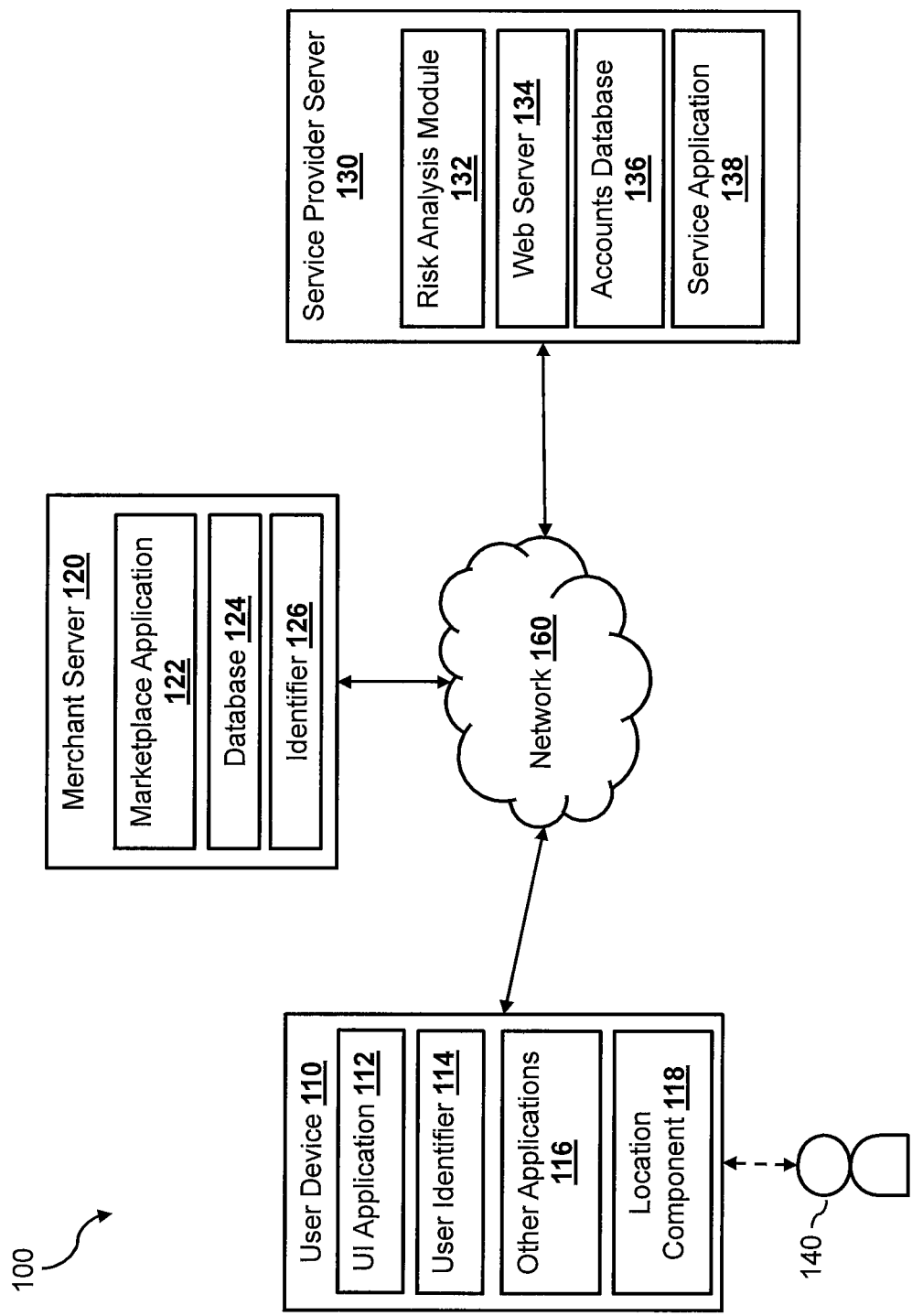
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for accessing (e.g., retrieving, updating, etc.) various data values in a record stored in a data store independently from other data values in the record and without de-serializing the record based on a primary key. A record may be composed of fields and corresponding data values that are organized according to a particular data structure. For example, the fields and corresponding data values may be organized in at least one of a list structure, a list-within-a-list structure, a map structure, a map-within-a-map structure, a tree structure, a table structure, a relational database structure, or any other types of data structure. Thus, a record may be organized in a linear or a non-linear (e.g., recursive) fashion.

In some embodiments, a data store may include multiple records, where each record may correspond to a particular entity, such as a user and/or a user account. As such, each record may include data (or information) associated with the corresponding entity. In an example where a record corresponds to a user account of a service provider, the record may include information for a user associated with the user account, such as name, gender, age, address, etc. The record may include electronic transaction history such as information related to previous electronic transactions that have been performed with the user account, various scores (e.g., a risk score, a trust score, etc.) computed for the user account, and any other type of information associated with the user account.

The data store may include a non-transitory memory (e.g., a hard drive, a flash drive, etc.) for storing the records. In some embodiments, the data store may be implemented as a database (e.g., Aerospike®, NoSQL®, Oracle®, etc.). In order to store a record in the data store, a record may first be serialized. For example, a data store management application of the data store may serialize the record by translating the record from the corresponding data structure to a format (e.g., a file, a series of bits) that can be stored or transmitted as a single unit. The serialized data (e.g., the file) may then be stored in the data store. In various instances, a serialized record is retrieved as a monolithic block of data, by performing a query based on a unique user ID, for example.

In some embodiments, the data store may also provide a mechanism for identifying the records. For example, a primary key that is unique to each record may be used to indicate to the data store which record one desires to access. To access the record, a user and/or an application may provide a particular primary key to the data store. The data store management application may then identify one of the serialized data (e.g., files) based on the particular primary key and retrieve the identified file from the data store. The data store management application may de-serialize the file by reconstructing the data structure from the file. The data store management application may then access the requested data value from the data structure.

In the event that the data structure is non-linear (e.g., recursive), the requested data value may reside in two or more levels below the root level. The data store management application may have to traverse the layers of the data structure before accessing and retrieving the requested data value from the record, before providing the requested data value to a user. As such, every time a record is accessed from the data store, the entire record needs to be de-serialized. The record may subsequently be updated, serialized, and then stored into the data store. In one example, even when a user submits a request to increment a single counter stored in a particular record, the data store management application may still have to de-serialize the file corresponding to the entire record, access the counter (e.g., may have to traverse one or more layers of the data structure of the record), increment the counter in the record, serialize the record, and store the serialized record back into the data store.

De-serializing and serializing records takes substantial amount of time and processing power. Much of the time and processing power is wasted as the entire record is required to be de-serialized/serialized even when only a portion (e.g., one particular data value from the record) of the data is needed from the record. Furthermore, while the portion of the data is accessed/updated, the entire record is locked in order to prevent data corruption of the record such that other data values cannot be accessed by other users/applications.

As such, in some embodiments of the disclosure, a data access system is provided that enables access of individual data values of a record independently from other data values in the record without de-serializing the record. In some embodiments, a data service module is provided on top of the data store for facilitating access and update to the records stored in the data store. The data service module may access each record in the data store, and generate for the records a table including a map of key-value pairs representing the data values in the records. For example, the data service module may request the data store to retrieve the records stored in the data store by providing the primary keys of the records. For each record, the data store management application of the data store may retrieve a file associated with the record based on a primary key of the record. The data store management application may de-serialize the file to reconstruct the data structure of the record. Once the data structure of the record is reconstructed, the data service module may traverse the data structure (e.g., traverse the different layers in the data structure) to obtain the data values and their corresponding data fields stored in the record.

Using the obtained data values and the corresponding data fields, the data service module may generate the key-value pairs for the table. For example, a new key-value pair may be generated for each data value stored in the record, where the data value corresponds to the value in the key-value pair. The key in the key-value pair may include the data field corresponding to the data value in the record. Key-value pairs need not be generated for each and every data value in a record, however—in some cases, a particular key may be used to retrieve multiple different record values simultaneously (but without having to access the entirety of all the data stored in the record). In some embodiments, the key and/or the table may also include information that identifies the record as well as the data field corresponding to the data value such that the key-value pair may be uniquely identified/accessed based solely on the key of the key-value pair. In some embodiments, even though the data structure of the record may be non-linear, the data structure of the generated map is flat, which provides direct access to each individual key-value pairs without traversing any data structure or other key-value pairs. In addition, the data service module may also store, for each record, metadata that indicates the data structure of the record and positions of each corresponding key-value pair within the data structure.

In some embodiments, a data service client may also be provided to handle data access requests from one or more applications (e.g., a risk engine). For example, a first application may submit a request for incrementing a first data value of a record stored in the data storage. The request may include a primary key associated with the record and a name of the data field associated with the first data value. Instead of using the primary key and the name of the data field to access the record in the data store, the data service client may use the primary key and/or the name of the data field to generate a key of a first key-value pair that corresponds to the first data value of the record in the data store. The data service client may transmit to the data service module 206 a request for incrementing a value based on the generated key. In some embodiments, the first application may not reside locally as the data store (e.g., not reside within the same physical computing device as the one that hosts the data store). As such, the data service client may be implemented to reside locally with the first application, and the request for incrementing the value may be transmitted to the data service module over a network (e.g., a local area network, the Internet, etc.).

When the data service module receives a request from the data service client, the data service module may access the generated table comprising the map of key-value pairs and retrieve the first key-value pair based on the key generated by the data service client, and increment the value stored in the first key-value pair. As discussed above, due to the data structure that stores the key-value pairs, the data service module may directly access the first key-value pair based on the generated key, without accessing other key-value pairs or the data structure of the record. In some embodiments, the data service module may also transmit the updated first key-value pair (or a first value of the updated first key-value pair) and the corresponding metadata to the data service client in response to the request. Upon receiving the first key-value pair and the corresponding metadata, the data service client may construct an object having a data structure similar to the data structure of the record, based on the metadata received from the data service module. The data service client may also insert the first value of the first key-value pair in a corresponding position in the data structure of the object based on the metadata. The data service client may then provide the object to the first application.

By providing to the first application the object having a similar data structure as the record, the data access system provides an illusion that the first application is accessing the record directly from the data store. When the first application requests to access another data value (e.g., a second data value) from the record, the data service client may retrieve a second key-value pair from the data service module in the same manner as discussed above, and insert a second value of the second key-value pair in a corresponding position within the data structure of the object. This way, the first application may access and/or navigate the data within the object as if the first application has direct access to the record of the data store.

Advantageously, the data structure of the generated maps of key-value pairs allows direct access to individual key-value pairs based on their corresponding keys. As such, when the data service module accesses/retrieves the first key-value pair, the data service module may perform the data access quickly as the data service module is not required to access other key-value pairs corresponding to data values of the same record or traverse the data structure, and is not required to de-serialize the record at the time of processing the data access request, which substantially improves the performance of the data access of the records stored in the data store. Further, the separation of data values within a record into different independently accessible key-value pairs also enables the data service module to simultaneously provide access to different data values within the same record to different applications. For example, at the time that the first application is requesting to increment the first data value of the record, a second application may also be requesting to increment a third data value of the record corresponding to a third key-value pair in the table. The second application may also be communicatively coupled with a data service client, which generates a key for the third key-value pair based on the data field associated with the third data value and the record. Since accessing the first key-value pair by the data service module does not affect any other key-value pairs in the record (e.g., does not lock the other key-value pairs), the data service module may access the third key-value pair when the first key-value pair is being updated. Thus, the values in the different key-value pairs may be accessed and/or updated simultaneously.

FIG. 1 illustrates an electronic transaction system 100 within which the data access system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct electronic transactions (e.g., electronic payment transactions, online purchase transactions, etc.) with the service provider server 130. Similarly, a merchant associated with the merchant server 120 may use the merchant server 120 to log in to a merchant account to conduct electronic transactions (e.g., electronic payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., log-in, perform electronic payments, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, an electronic fund transfer request, a request for adding a new user account, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100. Note that while a "merchant server" has been described above, this specification is not limited to such servers. Other types of computing devices (e.g. systems not necessarily corresponding to a merchant) are contemplated in place of merchant server 120 in various embodiments.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various electronic service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to determine whether to authorize or deny a request associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

In various embodiments, the service provider server includes a risk analysis module 132 that is configured to determine whether to authorize or deny an incoming request from the user device 110 or from the merchant server 120. The request may be a log-in request, a fund transfer request, a request for adding an additional funding source, or other types of electronic transaction requests associated with the variety of services offered by the service provider server 130. As such, when a new request is received at the service provider server 130 (e.g., by the web server 134), the risk analysis module 132 may request data associated with a particular user account (e.g., a risk score, previous transaction data, previous login attempts, etc.) from the accounts database 136. The risk analysis module 132 may then analyze (or evaluate) the request in view of the data retrieved from the accounts database 136, and may determine whether the request is possibly an unauthorized/fraudulent request based on information available to the risk analysis module. The risk analysis module 132 may transmit an indication of whether the request is possibly an unauthorized/fraudulent request to the web server 134 and/or the service application 138 such that the web server 134 and/or the service application 138 may process (e.g., approve or deny) the request based on the indication.

Figure 2:
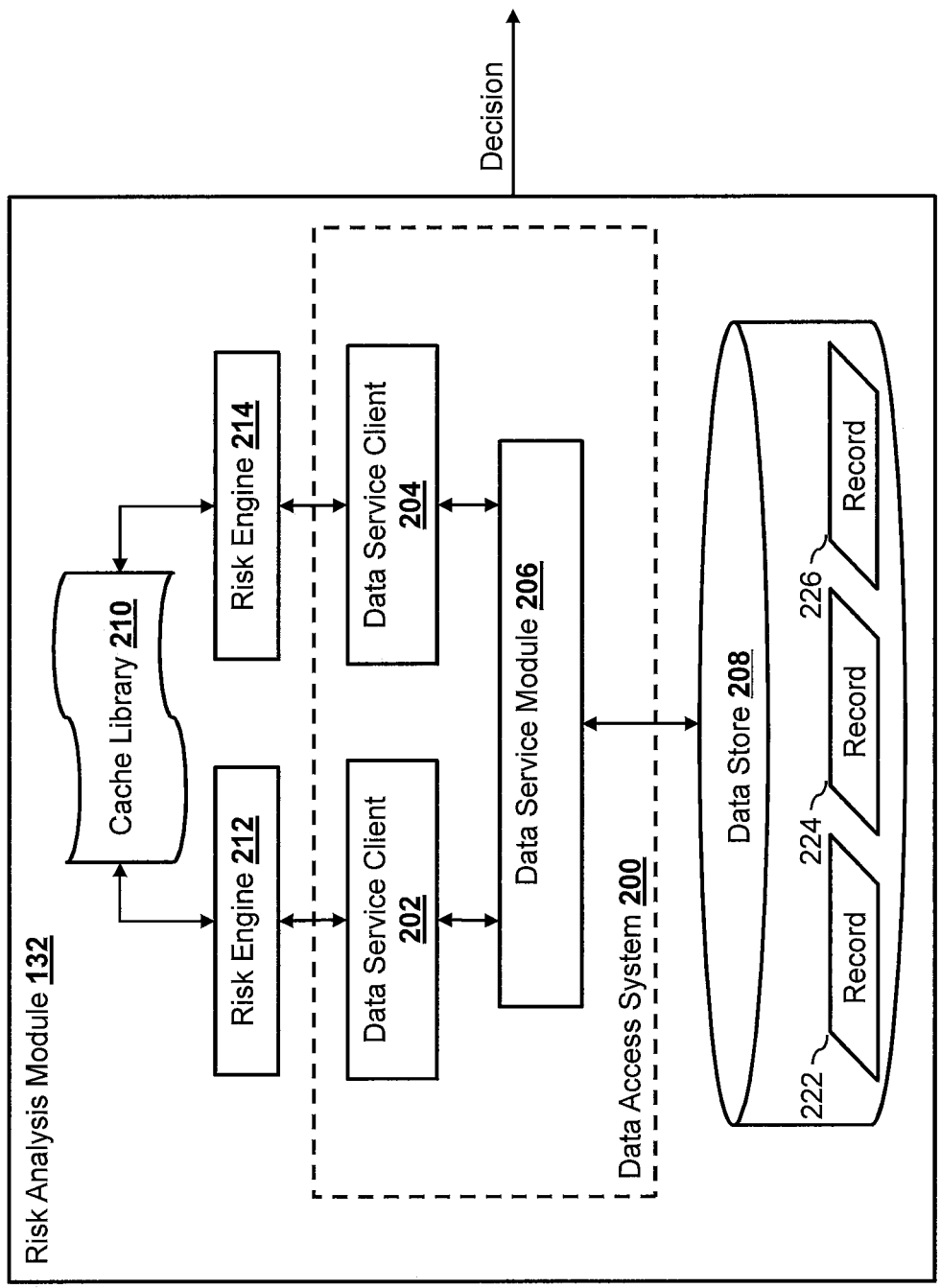
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes risk engines 212 and 214, a cache library 210, a data access system 200, and a data store 208. The data store 208 may correspond to the accounts database 136. In some embodiments, the data store may be implemented as a database and store records associated with different user accounts (e.g., records 222-226) with the service provider server 130. Each of the records 222-226 may include data fields and corresponding data values associate with a user account organized in a particular data structure. For example, the fields and the corresponding data values may be organized in at least one of a list structure, a list-within-a-list structure, a map structure, a map-within-a-map structure, a tree structure, a table structure, a relational database structure, or any other types of data structure. Thus, a record may be organized in a linear or a non-linear (e.g., recursive) fashion.

Each of the risk engines 212 and 214 may be implemented as a computer-based rule engine and may include multiple different sets of rules (or conditions) for evaluating a transaction request. When a transaction request is received by the risk analysis module 132 (e.g., a user initiated request received via the web server 134), the risk engine 212 and/or the risk engine 214 may use at least some of the different sets of conditions to evaluate the transaction request in order to generate an outcome. As discussed above, in some embodiments, based on whether some of the conditions are satisfied or not (using the data retrieved from the data store 208), the risk engine 212 and/or the risk engine 214 may generate an outcome that indicates whether the request is possibly an unauthorized/fraudulent request. The outcome may be a binary outcome or a score that indicates a likelihood of whether the request is possibly an unauthorized/fraudulent request. The outcome may be transmitted to other modules of the service provider server 130, such as the web server 134 and/or the service application 138, such that these other modules may process (e.g., approve or deny) the transaction request accordingly.

Figure 3:
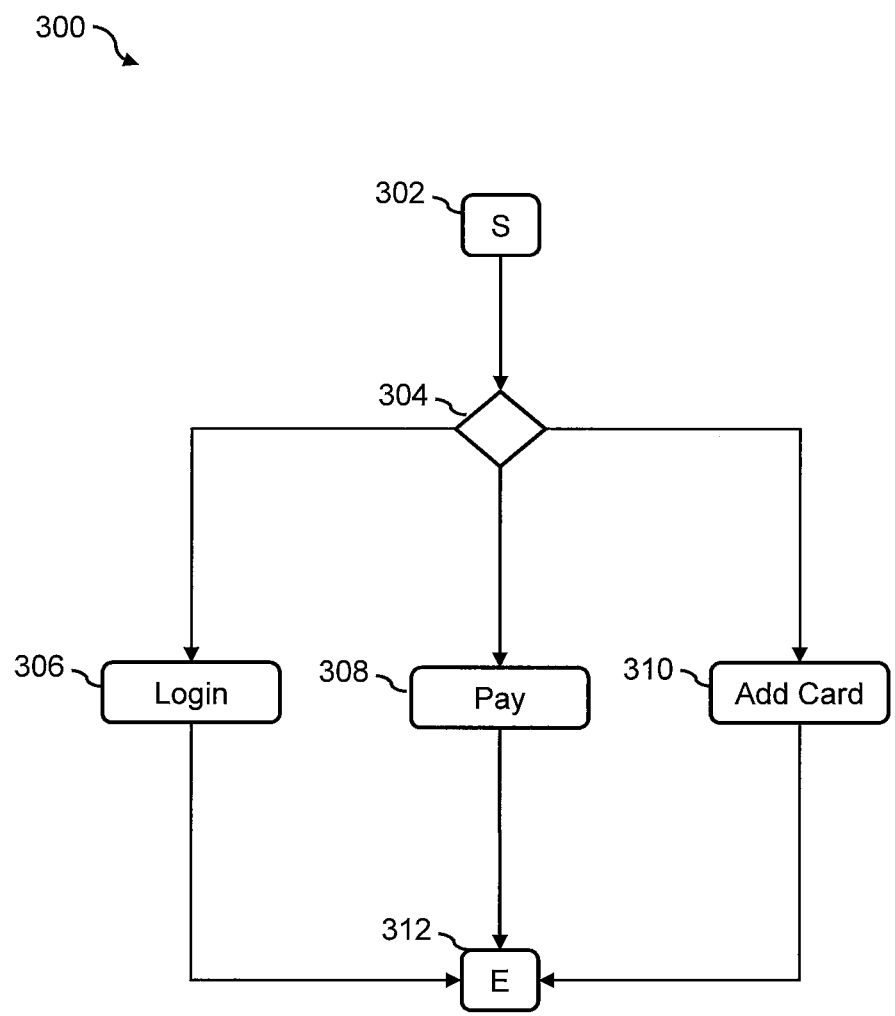
FIG. 3 illustrates an abstract syntax tree implemented by a risk engine according to an embodiment of the present disclosure.

FIG. 3 illustrates an abstract syntax tree 300 corresponding to an exemplary computer-based rule engine that may be implemented within the risk engine 212 and/or the rule engine 214. As shown, the abstract syntax tree 300 includes a start node 302 and an end node 312. When a transaction request is being evaluated, the rule engine 212 and/or the rule engine 214 begin the evaluation at the start node 302.

The start node 302 is connected to only one node 304, so the rule engine 212 and/or the rule engine 214 may continue along the path to traverse the node 304. The node 304 is connected to three different successor nodes 306, 308, and 310. As such, the rule engine 212 and/or the rule engine 214 may use information related to the transaction request to assess the set of conditions of the node 304. Based on the result from assessing the set of conditions of the node 304, the rule engine 212 and/or the rule engine 214 may take a path that leads to the node 306, a path that leads to the node 308, or a path that leads to the node 310. In this example, the set of conditions may include a condition of whether the transaction request is a login request, a condition of whether the transaction request is a payment transaction request, and a condition of whether the transaction request is a request to add a funding source to a user account. When it is determined that the transaction request is a login request, the rule engine 212 and/or the rule engine 214 may take the path that leads to the node 306.

The node 306 may also be referred to as a checkpoint. In some embodiments, the node 306 includes logic for evaluating the login request based on information related to a user account associated with the login request. For example, the logic at node 306 may require the rule engine 212 and/or the rule engine 214 to evaluate the login request based on an account-takeover score of the user account, representing a likelihood that the user account has been taken over by a malicious user. The account-takeover score may have been computed by the risk analysis module 132 and stored in a record associated with the user account within the data store 208. As such, at the node 306, the rule engine 212 and/or the rule engine 214 may request for the account-takeover score of the user account from the data store 208. Once the account-takeover score of the user account is retrieved, the rule engine 212 and/or the rule engine 214 may perform the necessary evaluation of the login request and produce an outcome (e.g., whether to grant or deny the login request). The rule engine 212 and/or the rule engine 214 then moves to the end node 312 to complete the evaluation process.

When it is determined that the transaction request is a payment transaction request, the rule engine 212 and/or the rule engine 214 may take the path that leads to the node 308. The node 308 may also be referred to as a checkpoint. In some embodiments, the node 308 includes logic for evaluating the payment transaction request based on information related to a user account associated with the payment transaction request. For example, the logic at node 308 may require the rule engine 212 and/or the rule engine 214 to evaluate the payment transaction request based on an amount of the transaction request and the account-takeover score of the user account. Similar to the node 306, at the node 308, the rule engine 212 and/or the rule engine 214 may request for the account-takeover score of the user account from the data store 208. Once the account-takeover score of the user account is retrieved, the rule engine 212 and/or the rule engine 214 may perform the necessary evaluation of the payment transaction request and produce an outcome (e.g., whether to grant or deny the payment transaction request). The rule engine 212 and/or the rule engine 214 then moves to the end node 312 to complete the evaluation process.

When it is determined that the transaction request is a request to add a funding source, the rule engine 212 and/or the rule engine 214 may take the path that leads to the node 310. The node 310 may also be referred to as another checkpoint. In some embodiments, the node 310 includes logic for evaluating the request for adding a funding source based on information related to a user account associated with the request. For example, the logic at node 310 may require the rule engine 212 and/or the rule engine 214 to evaluate the payment transaction request based on historic transaction data such as how often anew funding source is added to the user account. Similar to the nodes 306 and 308, at the node 310, the rule engine 212 and/or the rule engine 214 may request for the historic transaction data from the data store 208. Once the historic transaction data of the user account is retrieved, the rule engine 212 and/or the rule engine 214 may perform the necessary evaluation of the request and produce an outcome (e.g., whether to grant or deny the request). The rule engine 212 and/or the rule engine 214 then moves to the end node 312 to complete the evaluation process. It is noted that each of the rule engines 212 and 214 may implement only a portion of the abstract syntax tree 300. For example, the rule engine 212 may implement the logic for evaluating login requests where the rule engine 214 may implement the logic for evaluating payment transaction requests.

Referring back to FIG. 2, the data access system 200 includes data service clients 202 and 204, and a data service module 206 that work together to facilitate access of data from the data store 208 for the risk engines 212 and 214. Since the risk engines 212 and 214 may not reside locally with each other (e.g., implemented within different physical computing devices), the data access system 200 may provide different data service clients for servicing data access requests for the different risk engines. For example, the data service client 202 may be implemented within the same physical computing device as the risk engine 212 for servicing data access requests for the risk engine 212. Similarly, the data service client 204 may be implemented within the same physical computing device as the risk engine 214 for servicing data access requests for the risk engine 214. The data store 208 may be implemented in a physical computing device remote from the devices that implement the risk engines 212 and 214. In some embodiments, the data service module 206 may be implemented in the same physical computing device as the one that implements the data store 208 (for efficient access to the records from the data store 208). As such, the data service module 206 may communicate with the data service clients 202 and 204 over a network (e.g., a local area network, the Internet, etc.) using one of the computer network protocols (e.g., Internet Protocol, a messaging protocol, etc.).

In some embodiments, the cache library 210 provides a set of application programming interface (APIs) that enable the risk engines 212 and 214 to interface with the data service clients 202 and 204, respectively. For example, the cache library 210 may provide APIs for performing operations on the records stored in the data store 208, such as a 'get' operation, a 'put' operation, an 'increment' operation, a 'decrement' operation, an "append" operation, and a 'prepend' operation. The risk engines 212 and 214 may use the provided APIs to initiate a data retrieval operation (using the 'get' API), a data insertion operation (using the 'put' API), a data increment operation (using the 'increment' API), a data decrement operation (using the 'decrement' API), an operation to append new data to the existing data (using the 'append' API), and an operation to prepend new data to the existing data (using the 'prepend' API).

Figure 4:
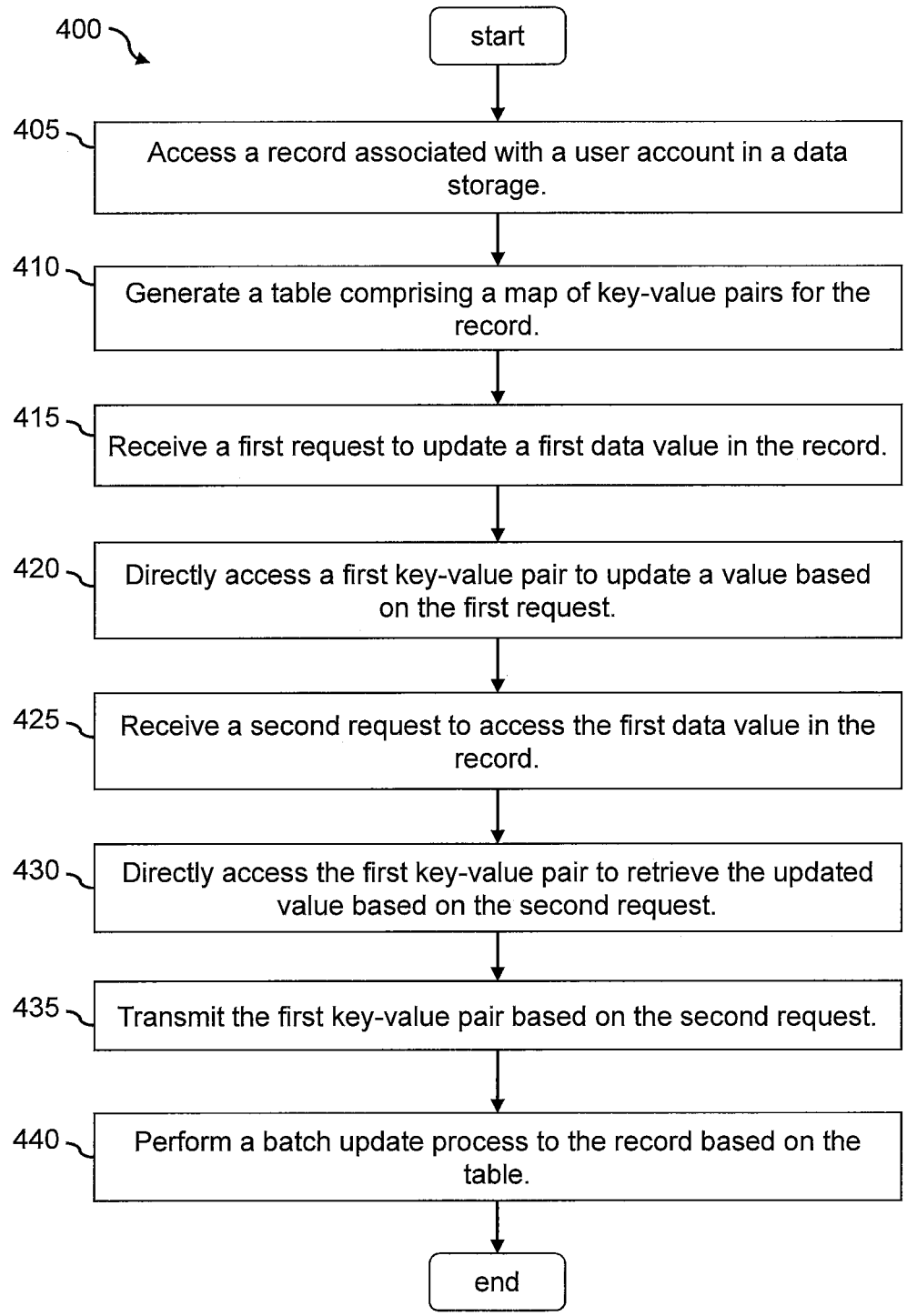
FIG. 4 is a flowchart showing a process of accessing records from a data store according to an embodiment of the present disclosure.

FIG. 4 illustrates a process 400 for accessing records from a data store according to an embodiment of the disclosure. In some embodiments, the process 400 may be performed by the data access system 200. The process 400 begins by accessing (at step 405) a record associated with a user account in a data storage. For example, the data service module 206 may submit a request to the data store 208 to access a record (e.g., the record 222) associated with a user account. In some embodiments, the data service module 206 may provide the data store 208 with a primary key associated with the record 222. Based on the primary key provided by the data service module 206, the data store 208 may identify and retrieve a file associated with the record 222 of the user account, de-serialize the file, and reconstruct the data structure of the record 222. The data store 208 may then provide the de-serialized record 222 to the data service module 206.

Figure 5:
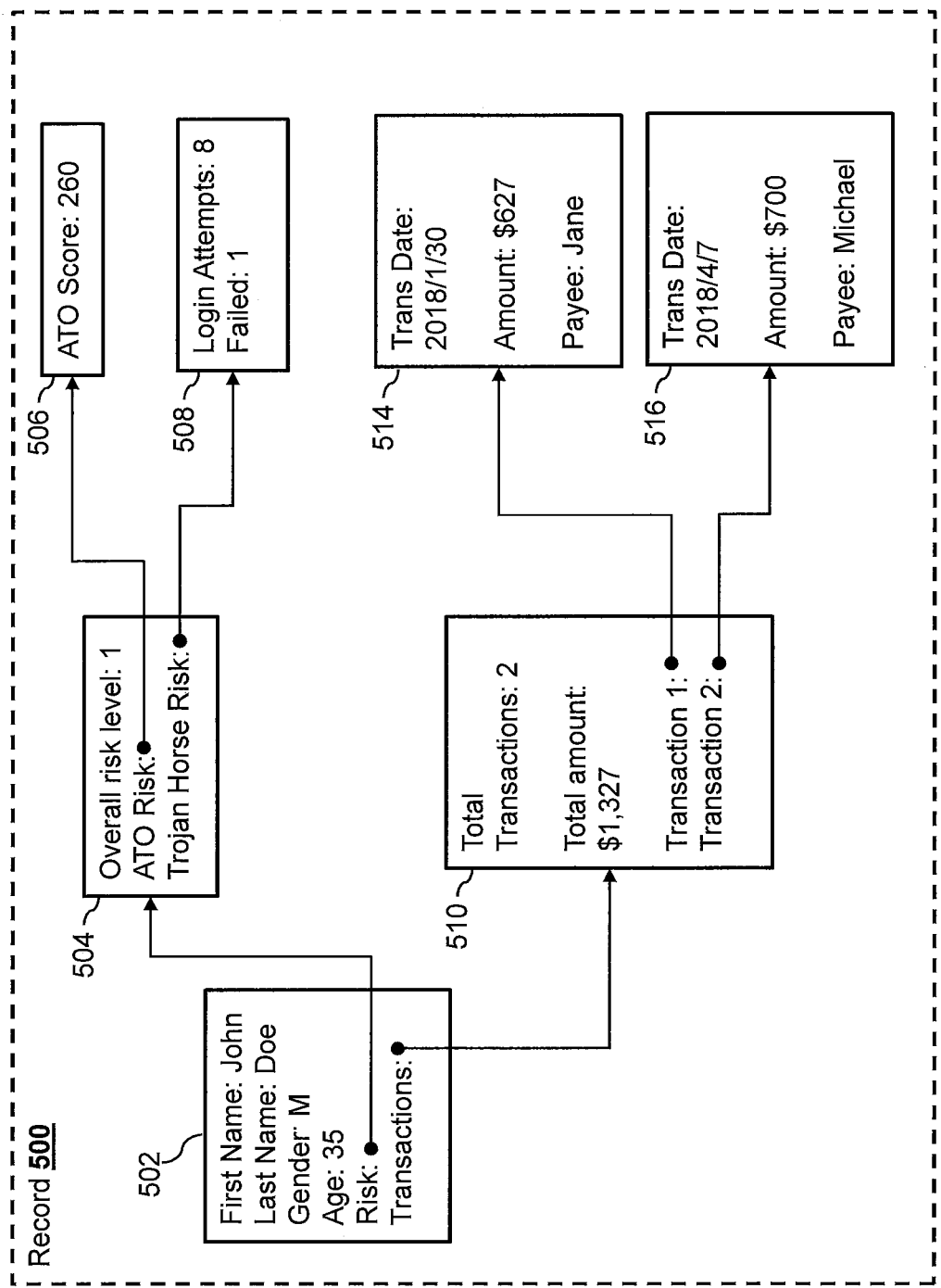
FIG. 5 illustrates an exemplary record according to an embodiment of the present disclosure.

FIG. 5 illustrates an exemplary record 500 according to one embodiment of the disclosure. The record 500 may correspond to the record 222. As shown, the record 500 stores data associated with a user account (for a user "John Doe") organized in a map-within-a map data structure. The record 500 includes a map 502 that stores a first name ("John"), a last name ("Doe"), a gender ("male"), and an age ("35") for the user account. The map 502 also includes another map 504 that stores risk data associated with the user account and another map 510 that stores transaction data associated with the user account. The map 504 stores an overall risk level ("1"), and also includes two other maps 506 and 508. The map 506 stores an account-takeover score ("260") of the user account. The map 508 stores a number of login attempts within the past 24 hours ("8") and a number of failed login attempts within the past 24 hours ("1").

The map 510 stores a total number of transactions within the past 7 days ("2") and a total amount of the transactions within the past 7 days ("1,327"). The map 510 also includes two other maps 514 and 516. The map 514 stores data associated with one of the transactions, including a transaction date ("Jan. 30, 2018"), a transaction amount ("$627"), and a payee ("Jane"). The map 516 stores data associated with the other one of the transactions, including a transaction date ("Apr. 7, 2018"), a transaction amount ("$700"), and a payee ("Michael").

The process 400 then generates (at step 410) a table comprising a map of key-value pairs based on the data in the record. For example, the data service module 206 may traverse the data structure of the record 222 to obtain all of the data values in the record 222. In the event that the record 222 has a recursive data structure (e.g., the map-within-the-map data structure), the data service module 206 may traverse different layers of the data structure to obtain data values of the record 222. The data service module 206 may then generate key-value pairs based on the obtained data values, where each key-value pair corresponds to a data value obtained from the record 222.

FIG. 6 illustrates a table 600 that includes a map of key-value pairs generated by the data service module 206 based on the record 500. As shown, the table 600 includes a key-value pair for every data values in the record 500. For example, the table 600 includes a key-value pair 602 for storing the first name field in the record 500, a key-value pair 604 for storing the last name field in the record 500, a key-value pair 606 for storing the gender field in the record 500, a key-value pair 608 for storing the age field in the record 500, a key-value pair 6010 for storing the overall risk level field in the record 500, a key-value pair 612 for storing the account-takeover score field in the record 500, a key-value pair 614 for storing the number of login attempts field in the record 500, a key-value pair 616 for storing the number of failed logins field in the record 500, a key-value pair 618 for storing the total number of transactions field in the record 500, a key-value pair 620 for storing the total transaction amount field in the record 500, a key-value pair 622 for storing the transaction date of the first transaction field in the record 500, a key-value pair 624 for storing the payee of the first transaction field in the record 500, a key-value pair 626 for storing the transaction amount of the first transaction field in the record 500, a key-value pair 628 for storing the transaction date of the second transaction field in the record 500, a key-value pair 624 for storing the payee of the second transaction field in the record 500, and a key-value pair 626 for storing the transaction amount of the second transaction field in the record 500.

As shown, even though the data structure of the record 500 is a non-linear data structure (e.g., having multiple layers of data), the generated table 600 has a flat data structure (e.g., all of the key-value pairs are on the same layer), such that the data service module 206 may access any one of the key-value pair without traversing different layers within a data structure. Furthermore, each of the key-value pairs in the table 600 may be independently accessible, such that the data service module 206 may access any one of the key-value pair in the table 600 without accessing and/or locking any other key-value pairs in the table 600. In some embodiments, the data service module 206 may determine a unique key for each of the key-value pairs within the table 600 such that the data service module 206 may identify each key-value pair based on its key. For example, while the key-value pairs 622 and 628 both store the transaction dates of the corresponding transaction, the data service module 206 may generate different keys for the key-value pairs 622 and 628 by attaching additional characters in the data field. In this example, the data service module 206 may generate the key "transaction 1 date" for the key-value pair 622 and the key "transaction 2 date" for the key-value pair 628 to differentiate the two. Similarly, the data service module 206 may generate the key "transaction 1 payee" for the key-value pair 624 and the key "transaction 2 payee" for the key-value pair 630 to differentiate the key-value pairs 624 and 630, and may generate the key "transaction 1 amount" for the key-value pair 626 and the key "transaction 2 amount" for the key-value pair 632 for the key-value pairs 626 and 632. As such, the data service module 206 may directly access each key-value pair by providing the corresponding unique key. Furthermore, the key-value pairs 602-632 are not bound together as an inseparable unit (e.g., a file) such that each key-value pair may be accessed independently of each other.

In some embodiments, the data service module 206 may perform the steps 405 and 410 as discussed herein on all of the records stored in the data store 208 to generate key-value pairs for the records 222, 224, and 226. The data service module 206 may also generate a mapping that maps a data field of a record to a key of a corresponding key-value pair, and may provide the mapping to the data service clients 202 and 204. The data service module 206 may store the key-value pairs associated with each record in a different table, such that each table corresponds to a record. Each table may then be assigned with a table identifier (e.g., based on the primary key associated with the record). In some embodiments, the key-value pairs generated from all of the records 222-226 may be contained within a single table. Furthermore, in some embodiments, the steps 405 and 410 for accessing records stored in the data store 208 and generating the table comprising a map of key-value pairs may be performed not in response to any requests for data from the data store 208. In some embodiments, the steps 405 and 410 are performed prior to receiving a request for data from the data store 208.

The process 400 then proceeds to step 415, where a first request to update a first data value in a record is received, and directly accesses (at step 420) a first key-value pair to update a value based on the first request. For example, upon receiving an electronic transaction request (e.g., a log-in request for logging in to a user account via the web server 134), the risk engine 212 may request to access certain data associated with the user account in order to evaluate the log-in request. In one example, the risk engine 212 may request to access an account-takeover score of the user account in order to evaluate the log-in request. As such, the risk engine 212 may use the 'get' API provided by the cache library 210 to submit a request to access the account-takeover score of the user account to the data service client 202. In some embodiments, the risk engine 212 may include an identifier of the user account (e.g., an account identifier, a primary key to a record associated with the user account, etc.) and the data field name associated with the account-takeover data field (e.g., "account-takeover score," "ATO score," etc.) in the "get" API call.

The data service client 202 may then generate a key (e.g., "ATO Score" of table 600) to a key-value pair corresponding to the account-takeover score of the user account (e.g., the key-value pair 612), for example, by using the mapping generated by the data service module 206. The data service client 202 then sends a 'get' request to the data service module 206 based on the generated key. Upon receiving the 'get' request from the data service client 202, the data service module 206 may directly access the key-value pair 612 from the table 600. As discussed herein, based on the data structure of the table 600, the data service module 206 may directly access the key-value pair 612 without accessing and/or locking any other key-value pairs in the table 600, such that the other key-value pairs in the table 600 may be simultaneously accessed by other application (e.g., the risk engine 214). For example, while the data service module 206 is accessing the key-value pair 612 for the 'get' request from the risk engine 212, another application (e.g., the risk engine 214) may request to access and/or update another data value of the record 222 (e.g., the "login attempts" data value) through the data service client 204, based on another login request initiated by, for example, the same user from another user device. Since accessing the key-value pair 612 does not lock any other key-value pairs in the table 600, the data service module 206 (or another instance of the data service module 206) may simultaneously provide the data access service to the risk engine 214 by accessing and/or updating the key-value pair 614 without delay. Furthermore, it is noted that the data value of the account-takeover score is stored in the third layer of data (e.g., in the map 506) in the data structure of the record 222. Thus, to retrieve the account-takeover score from the record 222 would require traversing at least two layers of data (and two maps) within the data structure, where using the key-value pairs in the table 600, the data service module 206 may directly access the key-value pair 612 corresponding to the account-takeover score without accessing any other key-value pair or traversing any layer of the data structure. As such, this mechanism substantially improves the time for the transaction requests to be evaluated and processed by the service provider server 130 over conventional techniques.

The data service module 206 may then provide the key-value pair 612 to the data service client 202 based on the 'get' request. In some embodiments, the data service module

206 may also provide metadata related to a data structure of the record (e.g., the record 222) to the data service client 202 in response to the 'get' request. Since the table 600 and the key-value pairs 602-632 were generated a priori (e.g., before receiving the request to access the account-takeover score of the user account), the data service module 206 accesses the key-value pair 612 and provide the key-value pair 612 without using the primary key of the record (e.g., the record 222) and without having to access and/or de-serialize the record 222 from the data store 208.

Upon receiving the key-value pair 612 and the metadata from the data service module 206, the data service client 202 may provide a value of the key-value pair 612 to the risk engine 212. In some embodiments, the data service client 202 may construct an object having a data structure similar to the data structure of the record 222 based on the metadata received from the data service module 206. The data service client 202 may also insert the value of the key-value pair 612 ("260") in a corresponding position in the data structure of the object based on the metadata (according to a position of the account-takeover score in the data structure of the record 222). The data service client 202 may then provide the object to the risk engine 212.

By providing the object (instead of simply the value in the key-value pair 612) to the risk engine 212, the data service system 200 becomes transparent to the risk engine 212 as the risk engine 212 has the illusion of accessing the record 222 directly from the data store 208. The risk engine 212 may use the value retrieved from the data access system 200 to evaluate the login request and generate an outcome to the web server 134. As discussed above, the outcome may indicate whether the login request is possibly an unauthorized/fraudulent request. The outcome may be a binary outcome or a score that indicates a likelihood of whether the request is possibly an unauthorized/fraudulent request. In some embodiments, after evaluating the login request, the risk engine 212 may compute/update the number of login attempts value for the user account. As such, the risk engine 212 may use the 'increment' API provided by the cache library 210 to submit a request to increment the value of the number of login attempts data field for the record 222 to the data service client 202. In some embodiments, the risk engine 212 may include an identifier of the user account (e.g., an account identifier, a primary key to a record associated with the user account, etc.) and the data field name associated with the number of login attempts data field (e.g., "login attempts," etc.) in the "increment" API call.

The data service client 202 may then generate a key (e.g., "Login Attempts" of table 600) to a key-value pair corresponding to the number of login attempts data field of the user account (e.g., the key-value pair 614), for example, by using the mapping generated by the data service module 206. The data service client 202 then sends an 'increment' request to the data service module 206 based on the generated key. Upon receiving the 'increment' request from the data service client 202, the data service module 206 may directly access the key-value pair 614 from the table 600 and update the value in the key-value pair 614 (e.g., changing the value from "8" to "9"). Similar to accessing the key-value pair 612, the data service module 206 updates the value in the key-value pair 614 without accessing and/or locking any other key-value pairs in the table 600, such that the other key-value pairs in the table 600 may be simultaneously accessed by other application (e.g., the risk engine 214). Furthermore, the data service module 206 updates the value of the key-value pair 614 without using the primary key of the record 222 associated with the user account and without accessing and/or de-serializing the record 222 from the data store 208.

In some embodiments, the data service module 206 may also provide the updated key-value pair 614 and the metadata associated with the data structure of the record 222 to the data service client 202. Since the object for the record 222 has already been constructed (for example, the object created for the risk engine 212 may be persistent over a user session), upon receiving the key-value pair 614 and the metadata, the data service client 202 may simply insert the updated value in the key-value pair 614 into the corresponding position in the data structure of the object based on the metadata. The data service client 202 may then provide the object to the risk engine 212. This way, the risk engine 212 may navigate the data structure of the object (in the same manner as navigating the data structure of the record 222) to access the account-takeover value and the login attempts value of the user account.

After the user has logged into a website associated with the service provider server 130, the user may initiate, within the same user session, an electronic payment transaction request using the user account via an input provided to the web server 134 via the website. The web server 134 may transmit the request to the risk engine 214 for evaluating the electronic payment transaction request. While evaluating the electronic payment transaction request, the risk engine 214 may request to access data related to the account-takeover score and the number of login attempts of the user account. As such, the process 400 receives (at step 425) a second request to access the first data value in the record and directly accesses (at step 430) the first key-value pair to retrieve the updated value based on the second request. For example, the risk engine 214 may use the 'get' API provided by the cache library 210 to submit a request to access the account-takeover score and the number of login attempts of the user account to the data service client 204. In some embodiments, the risk engine 212 may include the identifier of the user account (e.g., an account identifier, a primary key to a record associated with the user account, etc.) and the data field name associated with the account-takeover data field (e.g., "account-takeover score," "ATO score," etc.) and the data field name associated with the number of login attempts (e.g., "login attempts") in the "get" API call.

The data service client 204 may then generate a key (e.g., "ATO Score" of table 600) to a key-value pair corresponding to the account-takeover score of the user account (e.g., the key-value pair 612) and a key (e.g., "Login Attempts" of table 600) to a key-value pair corresponding to the number of login attempts data field of the user account (e.g., the key-value pair 614), for example, by using the mapping generated by the data service module 206. The data service client 204 then sends a 'get' request to the data service module 206 based on the generated keys. Upon receiving the 'get' request from the data service module 206, the data service module 206 may directly access the key-value pairs 612 and 614 from the table 600. As discussed above, based on the data structure of the table 600, the data service module 206 may directly access the key-value pairs 612 and 614 without accessing and/or locking any other key-value pairs in the table 600, such that the other key-value pairs in the table 600 may be simultaneously accessed by other application.

The process 400 then transmits (at step 435) the first key-value pair based on the second request. For example, the data service module 206 may provide the key-value pairs 612 and 614 to the data service client 204 based on the 'get' request. In some embodiments, the data service module 206 may also provide metadata related to a data structure of the record (e.g., the record 222) to the data service client 204 in response to the 'get' request. Upon receiving the key-value pairs 612 and 614, and the metadata from the data service module 206, the data service client 204 may construct an object having a data structure similar to the data structure of the record 222 based on the metadata received from the data service module 206. The data service client 204 may also insert the value of the key-value pair 612 ("260") and the updated value of the key-value pair 614 ("9") in a corresponding positions in the data structure of the object based on the metadata (e.g., according to the positions of the account-takeover score and the number of login attempts within the data structure of the record 222). The data service client 204 may then provide the object to the risk engine 214.

The data service module 206 may continue to provide access to and/or update different key-value pairs in the table (or other table generated for other records stored in the data store 208) based on requests received from the data service clients 202 and 204. While providing the data access service to the applications (e.g., the risk engines 212 and 214), key-value pairs may be updated (the values are changed) over time. As such, the process 400 then performs (at step 440) a batch update process to the record based on the table. For example, the data service module 206 may perform a batch update to the record 222 (and other records stored in the data store 208) based on the updated key-value pairs in the table 600 (and other generated tables). In some embodiments, the data service module 206 may periodically perform this batch update (e.g., every hour, every day, etc.) to ensure that the record 222 stored in the data store 208 is up to date. To perform the batch update process, the data service module 206 may provide a primary key of the record 222 to the data store. Based on the primary key, the data store 208 may identify and retrieve a file associated with the record 222, de-serialize the file to reconstruct the data structure of the record 222, and provide the de-serialized record 222 to the data service module 206. The data service module 206 may then perform updates to the data values stored in the record 222 based on the values of the key-value pairs generated for the record 222 (e.g., the key-value pairs 602-632). Once the updates are completed, the data store may serialize the updated record 222 by converting the record 222 back to a file, and store the file in the data store 208. The update process may be performed for other records (e.g., the records 224 and 226) stored in the data store 208 in the same manner.

Thus, the data access system 200 according to various embodiments of the disclosure improves the efficiency and flexibility of accessing data in the data store 208 by reducing the frequency of performing de-serializing and serializing on the records and allowing accesses to various data values in the same record simultaneously.

Figure 7:
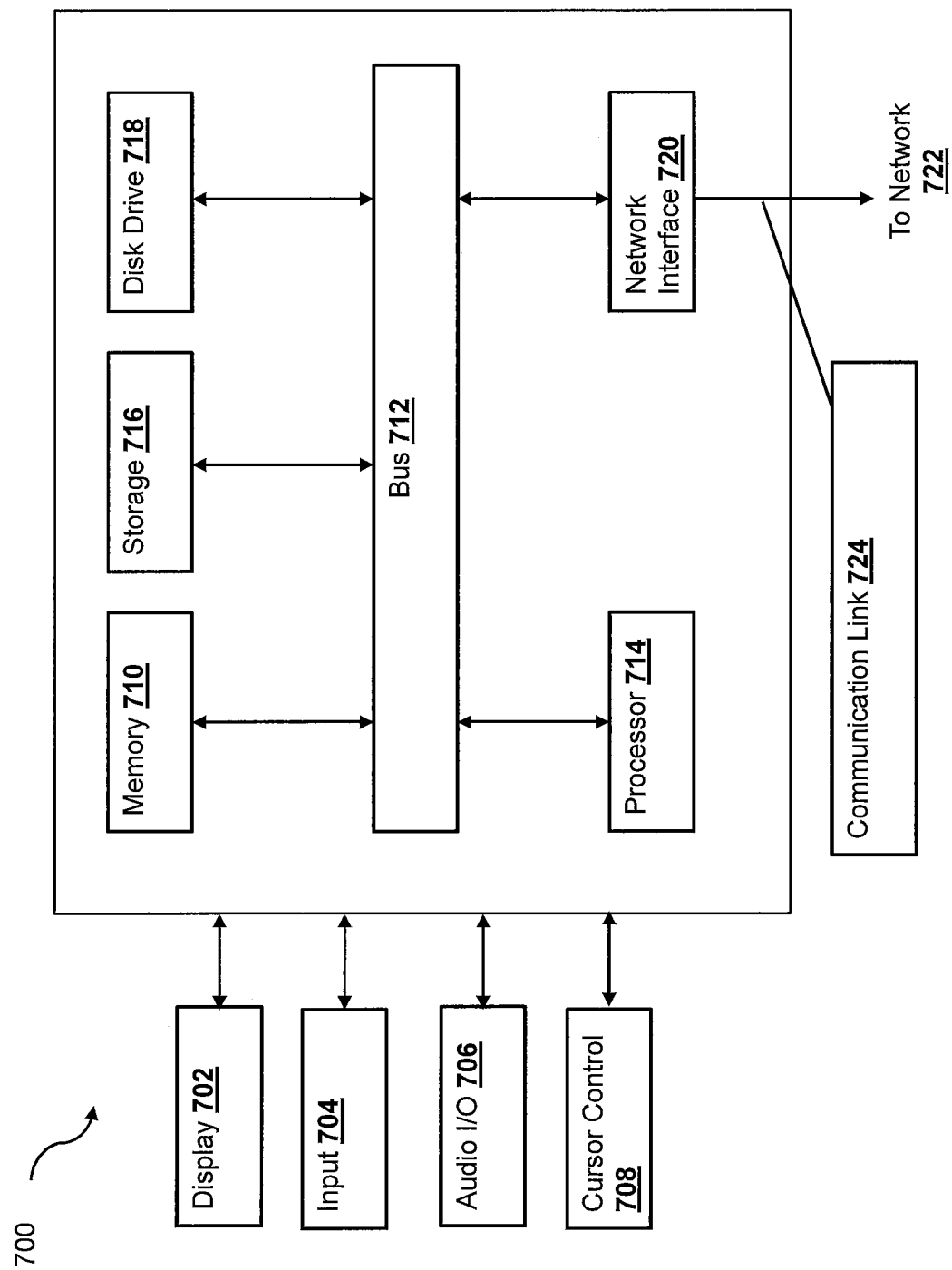
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a transaction page for initiating an electronic transaction. An optional audio input/output component 706 may also be included to allow a user to use voice for inputting information by converting audio signals. The audio I/O component 706 may allow the user to hear audio. A transceiver or network interface 920 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the risk analysis functionalities described herein according to the process 400.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A data access system comprising:
   a non-transitory memory; and
   one or more hardware processors communicatively coupled to the non-transitory memory and configured to read instructions from the non-transitory memory to perform operations comprising:
   accessing a record from a data store based on a particular primary key associated with the record, wherein the record comprises a plurality of data values associated with a user account organized according to a data structure;
   generating, for the record, a table comprising a map of key-value pairs corresponding to the plurality of data values;
   in response to receiving, from an application, a first request for a first data value in the record, directly accessing a first key-value pair from the table corresponding to the first data value independently from other key-value pairs in the table and without de-serializing the record based on the particular primary key;
   transmitting a first value of the first key-value pair to the application as a response to the first request;
   receiving, from the application, a second request for updating the first data value in the record;
   accessing the first key-value pair in the table independently from other key-value pairs in the table and without de-serializing the record based on the particular primary key; and
   modifying the first key-value pair by updating the first value of the first key-value pair based on the second request.

2. The system of claim 1, wherein the application is a first application, and wherein the operations further comprise:
   receiving, from a second application, a third request for updating a second data value in the record; and
   accessing a second key-value pair in the table corresponding to the second data value; and
   modifying the second key-value pair by updating a second value of the second key-value pair based on the third request, wherein the accessing the second key-value pair is performed in parallel to the accessing of the first key-value pair.

3. The system of claim 2, wherein the operations further comprise:
   performing a batch update process to update the record in the data storage based on the modified first key-value pair and the modified second key-value pair.

4. The system of claim 1, wherein the operations further comprise returning a signal indicating the first data value has been updated to the application as a response to the second request.

5. The system of claim 1, wherein the operations further comprise updating the record in the data store based on the modified first key-value pair.

6. The system of claim 1, wherein the first request comprises a first key associated with the first key-value pair.

7. The system of claim 1, wherein the data structure comprises a recursive data structure having a plurality of levels, and wherein the first data value is stored below a first level within the recursive data structure.

8. The system of claim 1, wherein the data structure is a first data structure, and wherein the operations further comprise:
   constructing an object having a second data structure corresponding to the first data structure of the record;
   inserting the first value of the first key-value pair in a first position within the second data structure of the object according to a second position of the first data value within the first data structure; and
   providing the object to the application as the response to the first request.

9. A method of accessing data, comprising:
   retrieving a record from a data store based on a particular primary key associated with the record, wherein the record comprises a plurality of data values associated with a user account organized according to a data structure;
   accessing, for the record, a table comprising a map of key-value pairs corresponding to the plurality of data values;
   in response to receiving, from a first application, a first request for updating a first data value in the record, directly accessing a first key-value pair from the table corresponding to the first data value independently from other key-value pairs in the table and without de-serializing the record based on the particular primary key;

modifying a first value of the first key-value pair based on the first request;

transmitting the modified first value to the first application as a response to the first request;

receiving, from a second application, a second request for the first data value in the record;

accessing the first key-value pair having the modified first value based on the second request; and transmitting the modified first value to the second application as a response to the second request.

10. The method of claim 9, wherein the modifying the first value comprises incrementing the first value.

11. The method of claim 9, wherein the modifying the first value comprises decrementing the first value.

12. The method of claim 9, wherein the second application is associated with a risk engine configured to evaluate a risk associated with a user request.

13. The method of claim 12, wherein the modified first value is used by the second application to evaluate the risk associated with the user request.

14. The method of claim 12, wherein the user request comprises at least one of a login request for logging in to the user account, an electronic fund transfer request associated with the user account, or an on-boarding request associated with the user account.

15. A non-transitory machine-readable medium having stored thereon machine-readable instructions executable to cause a machine to perform operations comprising:

accessing a record from a data store based on a particular primary key associated with the record, wherein the record comprises a plurality of data values associated with a user account organized according to a data structure;

generating, for the record, a table comprising a map of key-value pairs corresponding to the plurality of data values;

in response to receiving, from an application, a first request for a first data value in the record, directly accessing a first key-value pair from the table corresponding to the first data value independently from other key-value pairs in the table and without de-serializing the record based on the particular primary key;

transmitting a first value of the first key-value pair to the application via the network as a response to the first request;

receiving, from the application, a second request for incrementing a second data value in the record;

accessing a second key-value pair in the table corresponding to the second data value independently from other key-value pairs in the table and without de-serializing the record according to the particular primary key; and modifying the second key-value pair by updating a second value of the second key-value pair based on the request.

16. The non-transitory machine-readable medium of claim 15, wherein the data structure is a recursive data structure comprising at least one of a list-within-a-list structure or a map-within-a-map structure.

17. The non-transitory machine-readable medium of claim 15, wherein the application is a first application, and wherein the operations further comprise:

receiving, from a second application, a third request for updating a third data value in the record;

accessing a third key-value pair in the table corresponding to the third data value independently from other key-value pairs in the table and without de-serializing the record according to the particular primary key; and modifying a third value of the third key-value pair based on the request, wherein the accessing the third key-value pair is performed in parallel to the accessing the second key-value pair.

18. The non-transitory machine-readable medium of claim 17, wherein the operations further comprise:

performing a batch update process to update the record in the data storage based on the modified second key-value pair and the modified third key-value pair.

19. The non-transitory machine-readable medium of claim 15, wherein the operations further comprise returning a signal indicating the second data value has been updated to the application as a response to the second request.

20. The non-transitory machine-readable medium of claim 15, wherein the operations further comprise updating the record in the data store based on the modified second key-value pair.

* * * * *